United States Patent
Oboodi et al.

(10) Patent No.: US 10,801,111 B2
(45) Date of Patent: Oct. 13, 2020

(54) SINTERED-BONDED HIGH TEMPERATURE COATINGS FOR CERAMIC TURBOMACHINE COMPONENTS

(71) Applicant: HONEYWELL INTERNATIONAL INC., Morris Plains, NJ (US)

(72) Inventors: Reza Oboodi, Morris Plains, NJ (US); James Piascik, Randolph, NJ (US); Donald M. Olson, Dover, NJ (US); Natalie Kruk, Tempe, AZ (US); Terence Whalen, Morristown, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 125 days.

(21) Appl. No.: 15/608,574

(22) Filed: May 30, 2017

(65) Prior Publication Data
US 2018/0347049 A1 Dec. 6, 2018

(51) Int. Cl.
*C23C 18/12* (2006.01)
*C23C 18/04* (2006.01)
(Continued)

(52) U.S. Cl.
CPC .......... *C23C 18/125* (2013.01); *C04B 41/009* (2013.01); *C04B 41/5024* (2013.01);
(Continued)

(58) Field of Classification Search
CPC ..................................................... C23C 18/125
(Continued)

(56) References Cited

U.S. PATENT DOCUMENTS

| 4,753,902 A | 6/1988 | Ketcham |
| 6,025,078 A | 2/2000 | Rickerby et al. |

(Continued)

FOREIGN PATENT DOCUMENTS

| EP | 1044944 A1 | 10/2000 |
| EP | 2341166 A1 | 7/2011 |
| EP | 3141631 A1 | 3/2017 |

OTHER PUBLICATIONS

Lee, Rare earth silicate environmental barrier coatings for SiC/SiC composites and Si3N4 ceramics, Journal of the European Ceramic Society, 25 (2005), p. 1705-1715 (Year: 2005).*

(Continued)

*Primary Examiner* — Tabatha L Penny
(74) *Attorney, Agent, or Firm* — Lorenz & Kopf, LLP (57) ABSTRACT

Methods for forming sintered-bonded high temperature coatings over ceramic turbomachine components are provided, as are ceramic turbomachine components having such high temperature coatings formed thereover. In one embodiment, the method includes the step or process of removing a surface oxide layer from the ceramic component body of a turbomachine component to expose a treated surface of the ceramic component body. A first layer of coating precursor material, which has a solids content composed predominately of at least one rare earth silicate by weight percentage, is applied to the treated surface. The first layer of the coating precursor material is then heat treated to sinter the solids content and form a first sintered coating layer bonded to the treated surface. The steps of applying and sintering the coating precursor may be repeated, as desired, to build a sintered coating body to a desired thickness over the ceramic component body.

14 Claims, 6 Drawing Sheets

(51) Int. Cl.
*F01D 5/22* (2006.01)
*F01D 25/00* (2006.01)
*C04B 41/50* (2006.01)
*F23R 3/00* (2006.01)
*C04B 41/00* (2006.01)
*F01D 5/00* (2006.01)
*F01D 5/28* (2006.01)
*C04B 41/85* (2006.01)

(52) U.S. Cl.
CPC .............. *C04B 41/85* (2013.01); *C23C 18/04* (2013.01); *F01D 5/005* (2013.01); *F01D 5/225* (2013.01); *F01D 5/284* (2013.01); *F01D 5/288* (2013.01); *F01D 25/005* (2013.01); *F23R 3/007* (2013.01); *F01D 5/282* (2013.01); *F05D 2220/32* (2013.01); *F05D 2230/10* (2013.01); *F05D 2230/22* (2013.01); *F05D 2230/31* (2013.01); *F05D 2230/40* (2013.01); *F05D 2230/90* (2013.01); *F05D 2240/11* (2013.01); *F05D 2300/222* (2013.01); *F05D 2300/6033* (2013.01); *F23R 2900/00018* (2013.01)

(58) Field of Classification Search
USPC ....................................................... 427/376.1
See application file for complete search history.

(56) References Cited

U.S. PATENT DOCUMENTS

| | | | |
|---|---|---|---|
| 6,117,560 | A | 9/2000 | Maloney |
| 6,123,997 | A | 9/2000 | Schaeffer et al. |
| 6,929,852 | B2 | 8/2005 | Lane et al. |
| 6,982,126 | B2 | 1/2006 | Darolia et al. |
| 7,638,178 | B2 | 12/2009 | Raybould et al. |
| 7,740,960 | B1 | 6/2010 | Zhu et al. |
| 8,124,252 | B2 * | 2/2012 | Cybulsky .............. C04B 41/009 428/304.4 |
| 8,940,417 | B2 | 1/2015 | Courcot et al. |
| 9,387,512 | B2 | 7/2016 | Lee et al. |
| 2006/0151856 | A1 | 7/2006 | Torigoe et al. |
| 2006/0280952 | A1 | 12/2006 | Hazel et al. |
| 2008/0044663 | A1 | 2/2008 | Freling et al. |
| 2008/0107920 | A1 | 5/2008 | Rowe et al. |
| 2011/0027476 | A1 * | 2/2011 | Kirby ................... C04B 41/009 427/193 |
| 2011/0033284 | A1 | 2/2011 | Tryon et al. |
| 2011/0151132 | A1 | 6/2011 | Nagaraj et al. |
| 2013/0095256 | A1 | 4/2013 | Hass et al. |
| 2013/0224453 | A1 | 8/2013 | Hazel et al. |
| 2013/0344319 | A1 | 12/2013 | Zhu et al. |
| 2014/0255680 | A1 | 9/2014 | Lee et al. |
| 2015/0059802 | A1 | 3/2015 | Weaver et al. |
| 2015/0191828 | A1 | 7/2015 | Tolpygo et al. |
| 2015/0197456 | A1 | 7/2015 | Oboodi et al. |
| 2015/0233256 | A1 | 8/2015 | Anand et al. |
| 2016/0003063 | A1 | 1/2016 | Rosenzweig et al. |
| 2016/0076169 | A1 * | 3/2016 | Hashimoto ............. C30B 25/18 428/167 |
| 2016/0362557 | A1 | 12/2016 | Lee |
| 2017/0022113 | A1 | 1/2017 | Opila |

OTHER PUBLICATIONS

King, Wet Chemical Processing of (0001)Si 6H-SiC, Journal of The Electrochemical Society, 146 (5), p. 1910-1917 (1999) (Year: 1999).*
Extended EP Search Report for Application No. 18163495.7 dated Oct. 19, 2018.

* cited by examiner

SINTERED-BONDED HIGH TEMPERATURE COATINGS FOR CERAMIC TURBOMACHINE COMPONENTS

TECHNICAL FIELD

The present invention relates generally to turbomachine components and, more particularly, to sintered-bonded high temperature coatings formed over selected surfaces of ceramic turbomachine components, as well as to methods for forming such high temperature coatings.

ACRONYMS AND ABBREVIATIONS

The following acronyms appear throughout this document:
CMAS—Calcium-Magnesium Aluminosilicates;
CTE—Coefficient of Thermal Expansion;
EBC—Environmental Barrier Coating;
GTE—Gas Turbine Engine;
HP—High Pressure;
SEM—Scanning Electron Microscope;
TBC—Thermal Barrier Coating;
vol %—volume percentage; and
wt %—weight percentage.

BACKGROUND

Fuel efficiency, emission levels, thrust-to-weight ratios, and other measures of GTE performance can be boosted by increasing the core gas temperatures at which the GTE operates. To support high temperature GTE operation, GTE components located within the core gas flow path are commonly fabricated from superalloy materials, which have enhanced properties at elevated temperatures. GTE components composed of superalloy materials (herein, "superalloy GTE components") may still impose undesired temperature limitations on GTE operation, however, particularly in the case of emerging GTE platforms designed to operate at ever-increasing core gas temperatures. The temperature capabilities of superalloy GTE components can be improved through the usage of active cooling techniques and the provision of TBCs; however, such approaches provide only limited enhancements in temperature capabilities and add undesired cost and complexity to component manufacture. For these reasons, industry attention is increasing focusing on the fabrication of GTE components from advanced ceramic materials, which can withstand prolonged exposure to operative temperatures higher than those tolerable by comparable superalloy materials. Ceramic materials are also typically less dense than their superalloy counterparts and, thus, may also provide weight savings for flight applications.

While providing the above-noted benefits, GTE components composed of ceramic materials (herein, "ceramic GTE components") remain limited. As one primary limitation, ceramic GTE components are often prone to undesirable high temperature reactions with combustive byproducts. As a specific example, GTE components fabricated from silicon-ceramic materials, such as silicon carbide and silicon nitride, may be susceptible to recession due to high temperature reactions with mixtures of water vapor and oxygen (colloquially, "steam"). The silicon contained in such materials readily oxides to form silica, which reacts with steam at elevated temperatures to form volatile silicon hydroxide. Sublimation of the silicon hydroxide may then accelerate erosion of the silicon-ceramic material and drive rapid recession of the component body. EBCs can be formed over ceramic GTE components to provide enhanced protection from such high temperature reactions. Conventional EBCs, however, are also often susceptible to high temperature steam penetration and typically rely on metallic bond coats to join the EBC to the underlying component body. In many cases, the metallic bond coat may itself contain silicon and, thus, may also be prone to structural degradation due to high temperature steam reactions. In certain instances, fractures occurring within the bond coat and along the bond coat interfaces can result in premature EBC spallation and failure. As a still further limitation, conventional EBCs are typically poor thermal insulators and do little to shield the underlying ceramic component body from elevated surface temperatures.

There thus exists an ongoing demand for protective high temperature coatings suitable for formation over ceramic GTE components, which overcome one or more the limitations set-forth above. Ideally, such high temperature coatings would provide both thermal and environmental barrier protection, including resistance to high temperature steam penetration. It would also be desirable for such high temperature coatings to be relatively resistant to spallation and similar structural compromise within the high temperature GTE environment. Processes for forming such high temperature coatings over ceramic GTE components and, more generally, over ceramic turbomachine components are provided herein, as are ceramic turbomachine components having surfaces protected by high temperature coatings. Other desirable features and characteristics of embodiments of the present invention will become apparent from the subsequent Detailed Description and the appended Claims, taken in conjunction with the accompanying drawings and the foregoing Background.

BRIEF SUMMARY

Methods for forming sintered-bonded high temperature coatings over ceramic turbomachine components, such as silicon-ceramic GTE components, are provided. In various embodiments, the method includes the step or process of removing a surface oxide layer from the ceramic component body of a turbomachine component to expose a treated surface of the ceramic component body. A first layer of coating precursor material, which has a solids content composed predominately of at least one rare earth silicate by weight percentage, is applied to the treated surface. The first layer of the coating precursor material is heat treated to sinter the solids content and form a first sintered coating layer bonded to the treated surface. The steps of applying and sintering the coating precursor may be repeated, as desired, to successively build or compile a sintered coating body to a desired thickness over the ceramic component body. In certain implementations, the sintered coating body may be imparted with a controlled porosity by, for example, selectively embedding fugacious organic particles in one or more layers of the coating precursor material and thermally decomposing the organic particles during subsequent heat treatment. In such embodiments, the controlled porosity is usefully, but not necessarily varied by design, as taken through the thickness of the sintered coating body.

In other embodiments, the high temperature coating fabrication method includes the step of process of successively compiling or building-up a sintered coating body over a selected surface of a ceramic component body, such as the body of a silicon-ceramic GTE component. The sintered coating body may be compiled or built-up over the ceramic component body by repeating alternating the steps of: (i)

depositing a coating precursor material containing rare earth silicate particles over the selected surface of the ceramic component body, and (ii) heat treating the coating precursor material to sinter the rare earth silicate particles and form one or more sintered coating layers. Fugacious organic particles are selectively added to the coating precursor material and thermally decomposed during heat treatment to impart the sintered coating body with a varied porosity, as taken along an axis orthogonal to the selected surface. In certain embodiments of the high temperature coating fabrication method, a surface oxide may be etched away or otherwise removed from the selected surface of the ceramic component body prior to successively compiling the sintered coating body thereover. Additionally, steps may be taken to substantially prevent surface oxide regrowth prior to formation of at least an innermost portion of the sintered coating body (that is, the portion of the coating body closest the ceramic component body) such that the innermost portion of the sintered coating body is bonded directly to and intimately contacts the selected surface of the ceramic component body.

Embodiments of coated turbomachine components are further provided. In various embodiments, the coated turbomachine component includes a ceramic component body having a principal surface, as well as a high temperature coating comprising a sintered coating body bonded directly to and intimately contacting the principal surface of the ceramic component body. The sintered coating body has a minimum porosity adjacent the principal surface and a maximum porosity at a location further from the principal surface, as taken along an axis orthogonal to the principal surface. In certain implementations, one or more of the following conditions may further apply: (i) the minimum porosity is less than 10% by volume, while the maximum porosity is between 20% and 40% by volume; (ii) the sintered coating body may contain about 80% to 100% and 0% to about 20% of at least one glass sintering aid by weight; and/or (iii) the principal surface of the ceramic component body may be substantially free of oxide contaminants and may have an average surface roughness exceeding 01. microns (μm) and possibly exceeding 0.5 μm in certain instances. Finally, in one specific and non-limiting implementation, the ceramic component body assumes the form of a turbine shroud body, which is composed of a silicon-ceramic material and which has an inner peripheral surface over which the high temperature coating is formed.

BRIEF DESCRIPTION OF THE DRAWINGS

At least one example of the present invention will hereinafter be described in conjunction with the following figures, wherein like numerals denote like elements, and.

For simplicity and clarity of illustration, the drawing figures illustrate the general manner of construction, and descriptions and details of well-known features and techniques may be omitted to avoid unnecessarily obscuring the exemplary and non-limiting embodiments described in the subsequent Detailed Description. It should further be understood that features or elements appearing in the accompanying figures are not necessarily drawn to scale unless otherwise stated. For example, the dimensions of certain elements or regions in the figures may be exaggerated relative to other elements or regions to improve understanding of embodiments of the spallation-resistant high temperature and coated turbomachine components described herein.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. The term "exemplary," as appearing throughout this document, is synonymous with the term "example" and is utilized repeatedly below to emphasize that the following description provides only multiple non-limiting examples of the invention and should not be construed to restrict the scope of the invention, as set-out in the Claims, in any respect. As further appearing herein, statements indicating that a first layer is "bonded to" or "joined to" a second layer, surface, or body do not require that that the first layer is directly bonded to and intimately contact the second layer, surface, or body unless otherwise specifically stated.

Overview

The following describes processes for forming high temperature coatings over selected surfaces of ceramic turbomachine components, such GTE and turbocharger components. The high temperature coatings described herein may provide both thermal barrier protection and environment protection to silicon-ceramic GTE components, which are directly exposed to core gas flow during GTE operation; however, embodiments of the high temperature coating are not restricted to usage in conjunction with any particular type of GTE component. The following also describes coated turbomachine components having ceramic component bodies (also referred to below as "substrates") over which high temperature coatings are formed. The high temperature coatings described herein may be fabricated utilizing unique sintering processes and, when so formed, may be referred to as "sintered-bonded high temperature coatings."

Embodiments of the high temperature coating is are bonded directly to the underlying ceramic component body, thus eliminating reliance on an intervening bond coat for attachment purposes. Processing steps, requisite materials, and manufacturing costs may be favorably reduced through the elimination of any such bond coat. Furthermore, failure paths commonly observed in bond coat-reliant coating systems and stemming from bond coat structural compromise may be mitigated. In the absence of the bond coat, an intimate and mechanically-robust bond may be created between the high temperature coating and the underlying ceramic component body utilizing a sinter bonding process. Prior to sintering bonding, surface oxides present on selected surfaces of the ceramic component body may be removed. Additional measures may also be taken to deter surface oxide regrowth until coating sinter bonding is at least partially completed. Through such steps, a highly robust mechanical bond can be formed between the intimately-joined high temperature coating and the underlying ceramic component body. This mechanical bond may be further enhanced through tailored coating formulations and/ or by imparting the component body surfaces with a relatively rough surface topology during oxide removal, as described more fully below.

The high temperature coating may provide an environmental barrier function by shielding the underlying component body from contaminants, such as combustive byproducts. When formed over a silicon-ceramic component body, the high temperature coating may resist penetration of high temperature mixtures of water vapor and oxygen (herein, "steam"), which could otherwise drive recession of the underlying silicon-ceramic material by the mechanisms previously described. The high temperature coating may also serve as a thermal barrier due, at least in part, to a controlled, non-zero porosity within the coating body. The porosity of the high temperature coating may further enhance strain compliance to better accommodate CTE mismatches between the coating and the underlying component body. In certain implementations, the porosity of the high temperature coating may vary through the coating thickness, with minimum and maximum porosities potentially varying by a factor of two or more. By strategically varying coating porosity, the thermally insulative properties and strain compliance of the high temperature coating can be optimized, while further ensuring that the coating remains relatively resistant to steam penetration and is securely bonded to the underlying component body. The end result is a spallation-resistant, sinter-bonded high temperature coating, which can provide both environmental and thermal barrier protection for silicon-ceramic GTE components and other ceramic turbomachine components. This is highly desirable. An exemplary embodiment of such a sinter-bonded high temperature coating will now be described in conjunction with FIGS. 1-2.

Figure 1:
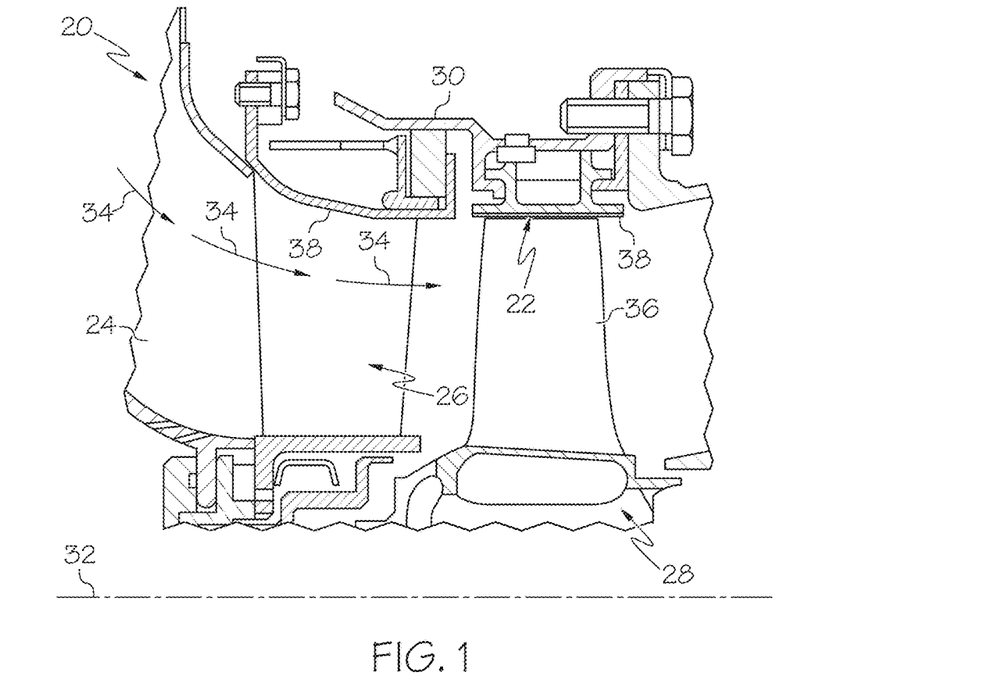
FIG. 1 is an isometric view of a GTE (partially shown), which contains a ceramic turbine rotor shroud over which a sinter-bonded high temperature coating is usefully formed, as illustrated in accordance with an exemplary embodiment of the present disclosure.

Examples of Ceramic Turbomachine Components Including Sinter-Bonded High Temperature Coatings FIG. 1 is a cross-sectional schematic of a GTE 20 (partially shown) including a ceramic turbine rotor shroud 22, as illustrated in accordance with an exemplary embodiment of the present disclosure. As shown in FIG. 1 and described below, ceramic turbine rotor shroud 22 is provided as a representative, but non-limiting example of a ceramic turbomachine component over which a sinter-bonded, high temperature coating can be beneficially formed. The following description notwithstanding, the below-described high temperature coating can be formed over various other ceramic turbomachine components in further embodiments. For example, in the context of GTE platforms, the below-described high temperature coatings may be formed over gas-exposed surfaces of other GTE components fabricated from ceramic materials including combustor liners, turbine nozzles, duct members, compressor shrouds, compressor rotor blades, and turbine rotor blades, to list but a few examples.

In addition to turbine rotor shroud 22, the illustrated portion of GTE 20 further includes a downstream or outlet end of a combustor 24, a turbine nozzle 26, an HP turbine rotor 28, and a surrounding engine case 30. The aforementioned components are only partially shown in FIG. 1, but are each generally axisymmetric about the centerline or rotational axis 32 of GTE 20. A core gas flow path 34 extends through the illustrated portion of GTE 20 and is generally defined by combustor 24, turbine nozzle 26, HP turbine rotor 28, and turbine rotor shroud 22. During operation of GTE 20, combustive gasses are discharged from combustor 24 and progress along flow path 34. HP turbine nozzle 26 is positioned downstream of combustor 24 and upstream of HP turbine rotor 28. HP turbine nozzle 26 thus receives the hot, combustive gas flow discharged by combustor 24 during GTE operation. HP turbine nozzle 26 meters, accelerates, and turns the combustive gas flow toward blades 36 of HP turbine rotor 28. The combustive gas flow drives rotation of HP turbine rotor 28 and the non-illustrated GTE shaft or shafts. This, in turn, drives the rotation of other non-illustrated GTE components (e.g., a fan or compressor rotor) and provides power output, which may be extracted from GTE 20 in different forms. Turbine rotor shroud 22 helps guide and contain the hot combustive gasses as they drive rotation of HP turbine rotor 28.

Turbine rotor shroud 22 is fabricated from a ceramic material, such as a monolithic or composite silicon-ceramic material of the type described below. Fabrication of turbine rotor shroud 22 from a ceramic material (as opposed to a superalloy material) may favorably increase the temperature capabilities of rotor shroud 22, which is exposed to peak temperatures and gas flow velocities due to its positioning downstream of combustor outlet end 24 and around HP turbine rotor 28. Fabrication of turbine rotor shroud 22 from a less dense ceramic material rather than a superalloy material may also provide weight savings, as valued in flight applications. These benefits notwithstanding, ceramic materials are commonly prone to structural degradation, such as material recession, due to high temperature reactions with combustive byproducts, such as steam, as previously described. Therefore, to shield the ceramic body of shroud 22 from undesired interactions with such combustive byproducts, a high temperature coating 38 is formed over one or more gas-exposed surfaces of turbine rotor shroud 22, particularly the inner peripheral surface of shroud 22. High temperature coating 38 may further thermally insulate the shroud component body from the peak local temperatures occurring at the gas-exposed surfaces of coating 38. Still further desirable characteristics may be provided by high temperature coating 38, as will become apparent from the following description.

Figure 2:
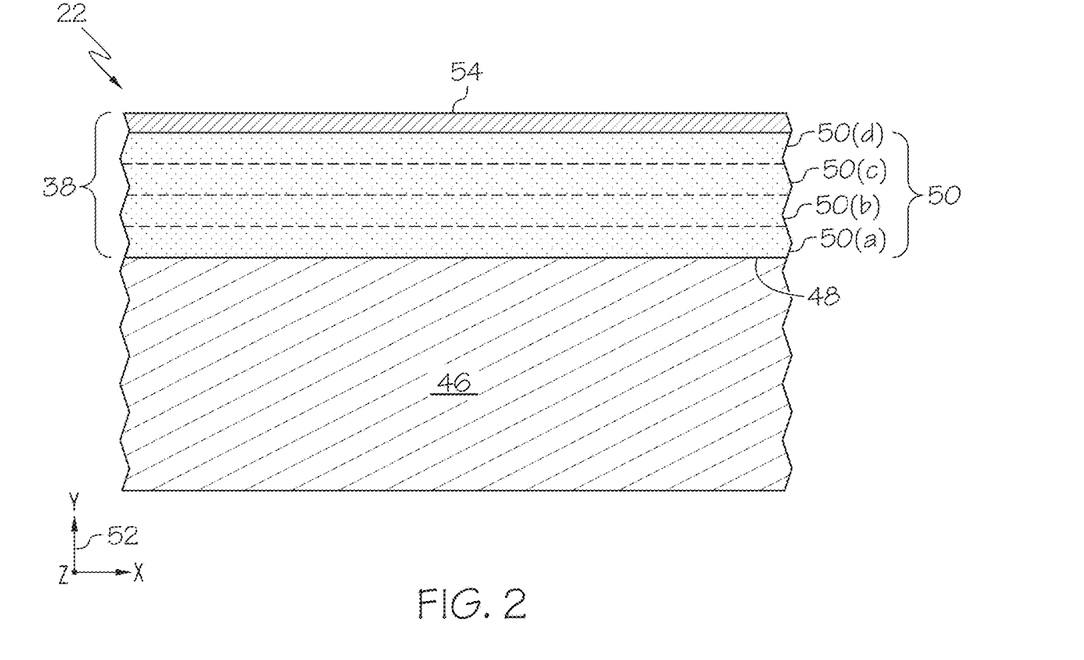
FIG. 2 is a cross-sectional schematic of a magnified region of the ceramic turbine rotor shroud shown in FIG. 1, which illustrates one possible implementation of the sinter-bonded high temperature coating in greater detail.

FIG. 2 is a cross-sectional view of a magnified region of turbine rotor shroud 22 illustrating a representative portion of high temperature coating 38 in greater detail, as shown in accordance with an exemplary embodiment of the present disclosure. Here, high temperature coating 38 is presented as a generalized schematic and is not drawn to scale; hence, the depicted coating layers contain within high temperature coating 38 and described below may vary in relative thickness in actual implementations of coating 38. In addition to high temperature coating 38, the illustrated portion of turbine rotor shroud 22 includes a ceramic component body 46 (partially shown) having a principal surface 48 over which high temperature coating 38 is formed. Principal surface 48 may correspond to the inner peripheral surface of turbine rotor shroud 22 shown in FIG. 1, which faces the high temperature gas flow conducted through GTE 20 (FIG. 1). Component body 46 serves as the base structure over which high temperature coating 38 is formed and is consequently be referred to hereafter as "ceramic component body/substrate 46."

As appearing herein, the terms "ceramic component body" and "ceramic substrate" are utilized interchangeable to refer to a body, substrate, or structure composed predominately of one or more ceramic materials, by wt % and/or vol %. The term "ceramic," in turn, refers to an inorganic and non-metallic material, whether crystalline or amorphous in structure. The term "ceramic" is defined to encompass both monolithic and composite materials. Finally, the term "silicon-ceramic material" refers to a ceramic material containing silicon as a primary constituent by wt % and/or vol %. Silicon-ceramic materials suitable for producing the ceramic component bodies and substrates described herein (e.g., ceramic component body/substrate 46 shown in FIG. 2) include monolithic ceramic materials, such as silicon carbide (SiC) and silicon nitride ($Si_3N_4$), and composite ceramic materials, such as silicon carbide-silicon carbide (SiC/SiC) composites and other silicon carbide-based composites.

High temperature coating 38 contains a sintered coating body 50. In many cases, sintered coating body 50 may make-up or constitute the volumetric majority of high temperature coating 38; and, in certain instances, sintered coating body 50 may constitute the entirety of high temperature coating 38. Sintered coating body 50 is, in turn, comprised of multiple sintered coating layers, which are successively formed over ceramic component body/substrate 46 to successively build-up sintered coating body 50 to a desired thickness. In depicted embodiment, four such sintered coating layers are shown and identified by reference numerals 50(a)-(d). In the following description, sintered coating layer 50(a) is referred to as the "innermost" or "base" sintered coating layer; these terms indicating that layer 50(a) is located closest to ceramic component body/substrate 46, as taken through the coating thickness along an axis orthogonal to principal surface 48 (corresponding to the Y-axis identified by coordinate legend 52 in FIG. 2). Conversely, sintered coating layer 50(d) is referred to below as the outermost layer contained in sintered coating body 50; the term "outermost" indicating that layer 50(d) is located furthest from ceramic component body/substrate 46 relative to coating layers 50(a)-(c), as taken through the coating thickness. While four sintered coating layers are shown in FIG. 2, high temperature coating 38 may include fewer or a greater number of sintered coating layers in further embodiments.

The respective compositions of sintered coating layers 50(a)-(d) may vary on a layer-to-layer basis in certain embodiments. In other embodiments, relatively little, if any variance exists between the respective compositions of sintered coating layers 50(a)-(d), possibly excluding slight variations in additives between the coating layers. In such embodiments, sintered coating body 50 may be described as possessing a substantially homogeneous or uniform chemical composition, as taken through its thickness. By way of example, at least one and perhaps all of sintered coating layers 50(a)-(d) may be predominately composed of one or more rare earth silicates, by wt % and/or vol %. Such rare earth silicates may be selected from the group consisting of gadolinium (Gd), lanthanum (La), lutetium (Lu) neodymium (Nd), samarium (Sm), scandium (Sc), terbium (Tb), ytterbium (Yb), yttrium (Y), and combinations thereof. In one specific, albeit non-limiting implementation, at least one of sintered coating layers 50(a)-(d) and, perhaps, all of coating layers 50(a)-(d) are predominately composed of ytterbium disilicate ($Yb_2Si_2O_7$) by wt %. In other implementations, at least one of sintered coating layers 50(a)-(d) may contain more than about 80 wt %, preferably more than about 90 wt %, and still more preferably more than about 95 wt % ytterbium disilicate. This stated, sintered coating layers 50(a)-(d) are not required to contain rare earth silicates in all embodiments. Sintered coating layers 50(a)-(d) may each be substantially devoid of organic materials; the term "substantially devoid," as appearing herein, defined as containing less than 1 wt % organic materials.

Sintered coating layers 50(a)-(d) may contain various other constituents in addition to one or more rare earth silicates. Other inorganic ceramic additives may be utilized to fine tune desired properties of high temperature coating 38. In embodiments, at least one and possibly all of sintered coating layers 50(a)-(d) contains a glass sintering aid, such as magnesia, alumina, and/or magnesioaluminosilicate particles. In this case, sintered coating layers 50(a)-(d) may each contain between about 0.5 wt % and about 10 wt % of the sintering aid (e.g., magnesia, alumina, and/or magnesioaluminosilicate) and may potentially contain lesser amounts of other additives, such as lithia, borate, and/or zinc oxide. In addition to or in lieu of glass sintering aids, various other additives (e.g., strength-increasing fibers) may also be introduced into sintered coating layers 50(a)-(d) to enhance the desired properties of high temperature coating 38. Finally, sintered coating layers 50(a)-(d) may also each contain trace amounts of organic residue remaining from fugacious organic materials initially contained in the coating precursor materials and thermally decomposed during heat treatment, as discussed more fully below in conjunction with FIG. 3.

Sintered coating body 50 may be imparted with a controlled, non-zero porosity. Generally stated, increased coating porosities may improve strain compliance within sintered coating body 50 and, therefore, enable high temperature coating 38 to better withstand mechanical stressors resulting from any CTE mismatch with ceramic component body/substrate 46. This may be particularly advantageous when sintered coating body 50 is directly bonded to ceramic component body/substrate 46 and consequently lacks an intervening bond coat, which may otherwise provide a CTE bridge between coating body 50 and body/substrate 46. Increased coating porosity also tends to reduce the overall heat transfer coefficient (k) of sintered coating body 50 and, thus, enhance the thermally insulative properties of coating 38. Conversely, increased coating porosity may adversely impact the mechanical strength of high temperature coating 38, detract from bond strength ceramic component body/substrate 46, and/or render sintered coating body 50 more susceptible to high temperature steam penetration. These competing factors can be balanced, in embodiments, by imparting sintered coating body 50 with a controlled, non-zero porosity, which is purposefully varied as taken through the coating thickness, as described more fully below.

To impart sintered coating body 50 with a thickness-varied porosity, voids may be created within one or more of layers 50(a)-(d) by selective addition and thermal decomposition of fugacious organic particles (pore formers) during the below-described heat treatment process. Different schemes in varying the porosity through the thickness of sintered coating body 50 may be employed. In certain embodiments, innermost sintered coating layer 50(a) may have a decreased average porosity relative to sintered coating layer 50(b) and, perhaps, relative to the average porosity taken through the remainder of sintered coating body 50. In this manner, bond strength at the interface of sintered coating layer 50(a) and ceramic component body/substrate 46 may be optimized, while the overall porosity of sintered coating body 50 is increased for improved strain compliance, fracture-resistance, and thermal insulation. In other embodiments, innermost coating layer 50(*a*) and outermost coating layer 50(*d*) may both be imparted with a decreased average porosity relative to intermediate coating layers 50(*b*)-(*c*) and/or the average porosity of sintered coating body 50. Such controlled variations in coating layer porosity may advantageously reduce the susceptibility of high temperature coating 38 to high temperature steam penetration, while still providing sintered coating body 50 with an increased porosity cumulatively. As a still further possibility, the coating layers may alternate in bilayer stacks between lower porosity and higher average porosities; e.g., in such implementations, coating layers 50(*a*), 50(*c*) may have a decreased porosity relative to coating layers 50(*b*), 50(*d*).

The porosities within coating layers 50(*a*)-(*d*) may also vary in certain instances. For example, it may be the case that sintered coating body 50 has decreased porosities in regions corresponding to one or more of the dashed lines shown in FIG. 2, which demarcate, in a generalize sense, the boundaries between sintered coating layers 50(*a*)-(*d*). Sintered coating body 50 may have a decreased porosity at one or more of these boundaries in embodiments wherein layers of the coating precursor material are applied in a wet state during the coating formation process described below in conjunction with FIG. 3. In such embodiments, the wet state coating material may seep or wick into the pores of an underlying coating layer such a relatively non-porous or less porous band is created with sintered coating body 50 generally correspond to the interface between sintered coating layers. This may be advantageous in that such less porous bands or striations may further help seal interior portions of coating body 50 from high temperature steam penetration.

Figure 6:
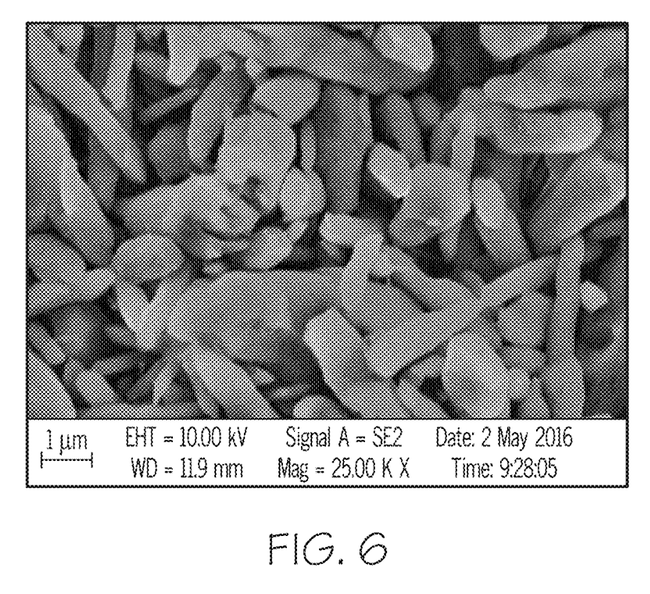

Innermost sintered coating layer 50(*a*) is advantageously bonded directly to principal surface 48 of ceramic component body/substrate 46. Depending upon the composition of ceramic component body/substrate 46, and pursuant to surface treatment (e.g., oxide removal) steps described below, surface 48 may be characterized by a relatively rough topology characterized by feature depths exceeding 1 micron (μm) on average. Surface oxide growth along surface 48 is usefully minimized to avoid covering such surface features, which can be leveraged to form a highly robust mechanical bond between high temperature coating 38 and ceramic component body/substrate 46. Moreover, in embodiments wherein principal surface 48 is characterized by a surface topology having three dimensional undercutting or overhanging (see FIG. 6), a mechanical lock effect may be created between innermost sintered coating layer 50(*a*) and surface 48 further enhancing bond strength. To achieve these desirable effects, any surface oxide present on surface 48 may be removed (e.g., by treatment with a chemical etchant) and subsequent measures may be taken to deter oxide regrowth prior to formation of sintered coating layer 50(*a*). Further description in this regard is provided below in conjunction with FIGS. 3-6.

If desired, a topcoat 54 can be formed over outermost sintered coating layer 50(*d*) and sintered coating body 50. When present, topcoat 54 may be utilized to backfill any exposed pores presented along the outer surface of sintered coating layer 50(*d*), which may be precision ground prior to the application of topcoat 54. Topcoat 54 may serve as an outer sealant layer further resisting contaminant ingress, such as steam penetration, into sintered coating body 50 during usage of high temperature coating 38. In this case, topcoat 54 may be formulated to have a porosity less than that of sintered coating layer 50(*d*) and may be applied utilizing any suitable deposition processes, such as a sol-gel deposition process. In other embodiments, topcoat 54 may have a formulation similar to that of sintered coating layer 50(*b*), but with a higher glass content (e.g., magnesia, alumina, and/or magnesioaluminosilicate) by wt %. Topcoat 54 can also be formulated to provide other high temperature functions, if desired, such as increased CMAS resistance and/or thermal barrier protection. In still other implementations, high temperature coating 38 may lack topcoat 54 such that sintered coating layer 50(*d*) is directly gas-exposed when turbine rotor shroud 22 (FIG. 1) is placed with the high temperature GTE environment. Exemplary processes for producing a high temperature coating over a turbomachine component, such as high temperature coating 38 formed on ceramic turbine rotor shroud 22, will now be described in conjunction with FIG. 3.

Exemplary High Temperature Coating Formation Processes

Figure 3:
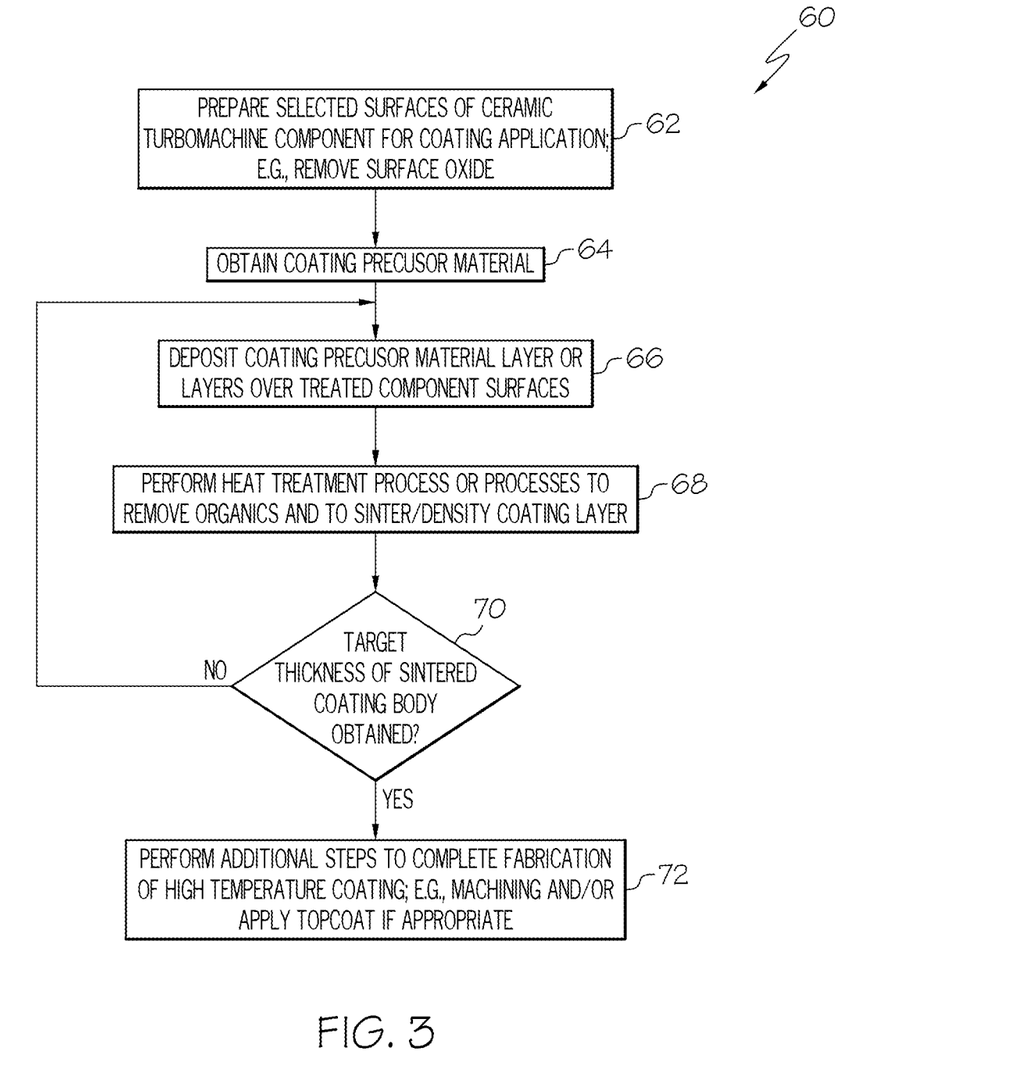
FIG. 3 is a flowchart setting-forth an exemplary process for forming a sinter-bonded high temperature coating over a ceramic turbomachine component, such as the ceramic turbine rotor shroud shown in FIGS. 1-2.

FIG. 3 is a flowchart setting-forth a process 60 for forming a sinter-bonded high temperature coating over selected surfaces of a ceramic turbomachine component, as illustrated in accordance with an exemplary embodiment of the present disclosure. For consistency with the foregoing description, high temperature coating formation process 60 is primarily described below in conjunction with the production of high temperature coating 38 over body/substrate 46 of turbine rotor shroud 22 shown in FIG. 1. This notwithstanding, process 60 can further be employed to produce sinter-bonded high temperature coatings over various other types of ceramic turbomachine components, without limitation. High temperature coating formation process 60 includes a number of sequentially-performed process steps (STEPS 62, 64, 66, 68, 70, 72). Depending upon the particular manner in which high temperature coating formation process 60 is implemented, each step generically illustrated in FIG. 3 may entail a single process or multiple sub-processes. Furthermore, the steps illustrated in FIG. 3 and described below are provided by way of non-limiting example only. In alternative embodiments of high temperature coating formation process 60, additional process steps may be performed, certain steps may be omitted, and/or the illustrated steps may be performed in alternative sequences.

High temperature coating formation process 60 commences at STEP 62 by preparing selected surfaces of the ceramic body of a turbomachine component, such as turbine rotor shroud 22 (FIG. 1). Surface preparation may entail and possibly consist essentially of a surface oxide removal process when such surface oxides are present on the selected component surfaces. Surface oxides will often be present for multiple reasons. First, ceramic materials, particularly silicon-ceramic materials, are typically highly prone to rapid oxide (e.g., silica) growth when exposed to ambient air. Second, material vendors or suppliers commonly grown oxide layers on ceramic material bodies to protect the underlying ceramic material body. While this is immaterial, if not beneficial in many instances, such surface oxides are usefully (although not essentially) removed during STEP 62 of process 60. Various different oxide remove techniques may be utilized for this purpose including chemical stripping; mechanical removal techniques, such lapping, grinding, and polishing; and combinations thereof.

Figure 4:
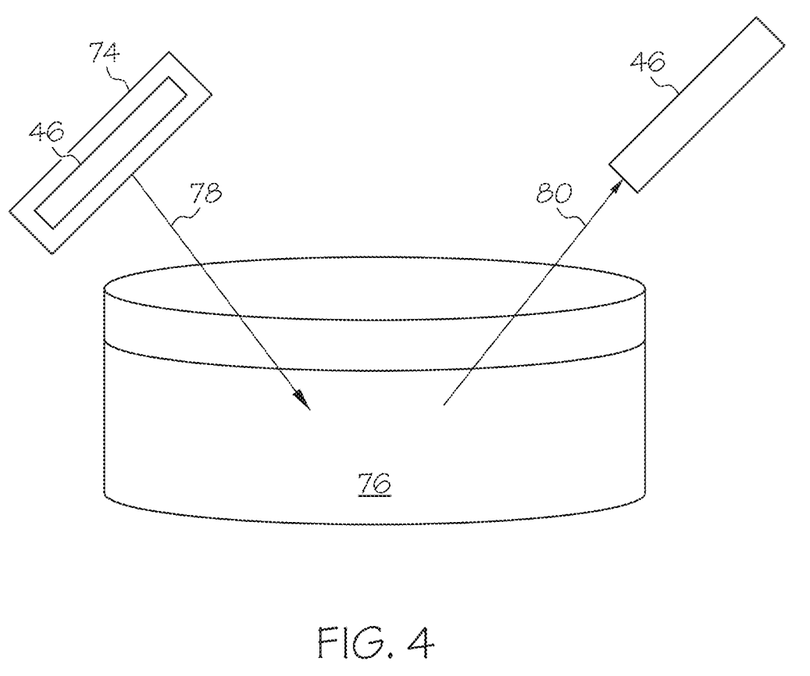
FIGS. 4-7 illustrate a generalized ceramic turbomachine component and high temperature coating during various sequentially-performed stages of the exemplary high temperature coating formation process of FIG. 3.
Figure 5:
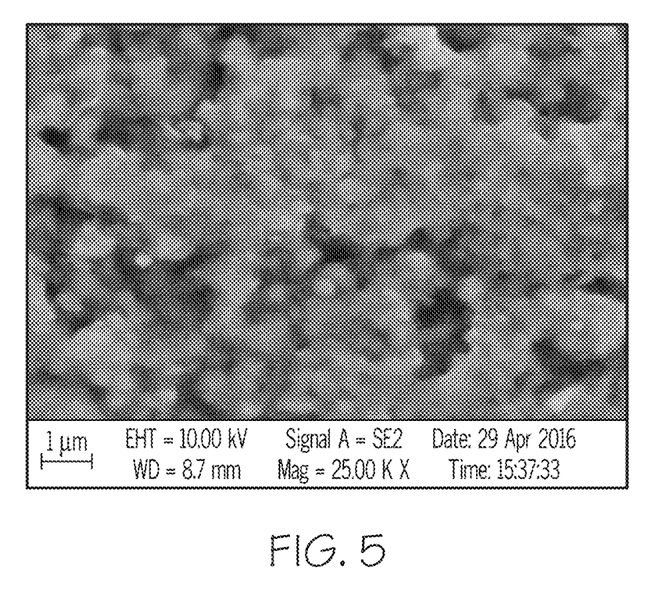

Etching is a preferred technique utilized to strip surface oxides during STEP 62 of process 60 (FIG. 3). Further emphasizing this point, FIG. 4 provides a highly generalized depiction of wet etch that may be employed for this purpose. As depicted, a ceramic component body/substrate 46 having a surface oxide layer 74 may be contacted with a wet etch chemistry; reference numeral "46" carried-over from FIG. 2 for consistency. The liquid etchant may be present as a pool or bath 76. During the wet etch process, ceramic component body/substrate 46 may be dipped or otherwise submerged in bath 76, as indicated in FIG. 3 by arrow 78. Agitation and/or elevated bath temperatures may accelerate the etch process. After a predetermination duration of time, ceramic component body/substrate 46 is removed from bath 76, as indicated by arrow 80. This results in the removal of surface oxides from those regions of ceramic component body/substrate 46 contacted by the wet etchant, as generically depicted on the right side of FIG. 3. This process may be performed in vacuum or in a non-oxidizing (e.g., reducing) atmosphere to prevent rapid regrowth of the surface oxide upon removal of ceramic component body/substrate 46 from bath 76. The particular etchant chemistry utilized will vary in relation to the type of surface oxide removed, the composition of ceramic component body/substrate 46, and other such factors. By way of example, a molten sodium hydroxide (NaOH) etch chemistry is well-suited for the removal of silica scale from a silicon-ceramic component bodies. In alternative embodiments, other etch chemistries and/or a dry etch (e.g., plasma etching or reactive ion etching) may be employed.

Other processes can be performed during STEP 62 of process 60 (FIG. 3) to further prepare the selected surface or surfaces for high temperature coating formation. In this regard, the selected components surfaces may be intentionally roughed by mild abrasion, chemical treatment, or the like. If performed, such dedicated roughening steps may be carried-out prior to removal of the surface oxide. It has been found, however, that a relatively rough surface topology (that is, a surface topology characterized by average feature heights or depths exceeding 0.1 µm and, perhaps, exceeding 0.5 µm) may be achieved without such additional roughing steps when, for example, glass phases present within the component body or substrate material are removed from along the treated surface(s). As a more specific example, in instances in which ceramic component body/substrate 46 (FIGS. 2 and 4) is composed of a silicon-ceramic material, such as a silicon nitride (SiN), silicon carbide (SiC), or a silicon nitride-based composite, treatment with molten sodium hydroxide (NaOH) or another silica-selective etchant chemistry can remove glass phases from the silicon-ceramic material and, in so doing, create a relatively rough surface topology promoting enhanced bonding with the subsequently-formed high temperature coating. This may be more fully appreciated by comparing FIGS. 5-6 (described below), which are SEM images of the surface topology of a sample silicon-ceramic component body or substrate captured prior to (FIG. 5) and after (FIG. 6) wet etch removal of the surface oxide (shown in FIG. 5).

As indicated above, removal of surface oxides utilizing an oxide-selective etchant chemistry may concurrently remove glass phases from the ceramic material to yield a relatively rough or non-planar surface topology at the treated component surfaces. An example of this surface topology is presented in the SEM image of FIG. 6. As can be seen, the resultant surface topology is generally characterized by rod-like projections having average feature heights approaching or exceeding 1 µm, as taken along an axis orthogonal to the treated surface; e.g., corresponding to the Y-axis identified by coordinate legend 52 in FIG. 2. Such rod-like projections may also have undercut or overhang regions, which provide a mechanical lock effect when contacted and infiltrated by the innermost sintered coating layer of the high temperature coating; e.g., sintered coating layer 50(a) of high temperature coating 38 (FIG. 2). Providing that any surface oxide regrowth is restricted to less than the feature height prior to formation of the innermost sintered coating layer, this mechanical lock effect can be leveraged to achieve excellent bond strength between the sintered coating body and ceramic component body/substrate 46 in the absence of an intervening bond coat.

With continued reference to FIG. 3, high temperature coating formation process 60 continues with producing, purchasing, or otherwise obtaining a coating precursor material (STEP 64, FIG. 3). The coating precursor material contains particulate solids, such as rare earth silicates, glass sintering aids, and other such constituents, which are non-fugacious in nature and remain in the final, post-sintering coating composition. Particle size, particle shape, composition, and distribution of the solids content within the coating precursor material are precisely controlled during the coating precursor material production and application steps to yield desired results. In various embodiments, the glass sintering aid particles may vary from about 0 wt % to about 20 wt % of total solids content within the coating precursor material, while rare earth silicate particles constitute a greater portion of, and perhaps the remainder of, the solids content within the coating precursor material. Similarly, in one non-limiting embodiment, the solids content of the coating precursor material may consist essentially of about 0 wt % to about 20 wt % glass sintering aid and about 80 wt % to about 100 wt % rare earth silicates. In other implementations, the coating precursor material may contain between about 90 wt % and about 99 wt % ytterbium disilicate particles, and/or about 1 wt % to about 10 wt % of one or more glass sintering aides selected from the group consisting of magnesioaluminosilicate, magnesia, and alumina particles. In still further embodiments, the coating precursor material may contain about 1 wt % to about 5 wt % and, perhaps, about 2 wt % to about 4 wt % magnesioaluminosilicate particles.

As indicated above, the coating precursor material may contain rare earth silicate particles (e.g., monosilicate or disilicate particles) and glass sintering aid particles of varying sizes and/or shapes. Suitable particle shapes include, but are not limited to, spherical, oblong, rod- or whisker-like, and platelet or laminae shapes. In embodiments, the rare earth silicate particles may have a first average minimum cross-sectional dimension (e.g., diameter in the case of spherical particles) and may be combined with lesser amounts (by wt %) of one or more glass sintering aids. The glass sintering aid(s) may have, in turn, a second average minimum cross-sectional dimension (e.g., diameter) greater than the first average minimum cross-sectional dimension (e.g., diameter). As a more specific example, the rare earth silicate (e.g., ytterbium disilicate) particles may have an average minimum cross-sectional dimension (e.g. diameter) between about 1 µm and about 5 µm, inclusive, while the sintering aid (e.g., alumina, magnesia, and/or magnesioaluminosilicate) particles may have a greater average minimum cross-sectional dimension ranging between about 3 µm and about 10 µm, inclusive. Various other additives may be introduced into the solids content, as desired, including fibers or particles added for reinforcement purposes.

The non-fugacious solids content may be mixed or otherwise combined with fugacious or sacrificial organic ingredients, such as solvents, binders, surfactants, and other such chemicals, to produce the coating precursor material. Depending upon relative quantities, chemical types, and viscosities, the coating precursor material may be applied in a dry state or wet state as, for example, a solution, a suspension, a paste, a tape, a slip, or a slurry, to list but a few examples. When a wet state deposition technique is utilized, the coating precursor material may have a liquids content including a binder, such as isobutyl methacrylate; a solvent, such as a-terpineol; and/or a surfactant, such as tridecyl acid phosphate or an alkyl phenol ethoxylated phosphoric acid sodium salt. In such embodiments, the binder may vary from about 0 vol % to about 50 vol % of total liquid contents in the coating precursor material; the surfactant may vary from about 0 vol % to about 10 vol % of total liquids content; and the solvent may vary from about 0 vol % to about 100 vol % of total liquid content. In other embodiments, the liquid content of the coating precursor material may vary or the coating material may be applied in a dry state (e.g., utilizing a thin film transfer process) and contain relatively little liquid or moisture content.

One or more layers of the coating precursor material are next deposited over the selected component surfaces at STEP 66 of high temperature coating formation process 60. Various different deposition techniques may be utilized, with preferred deposition techniques allowing application of relatively thin coating precursor layers (e.g., layers having thicknesses less than 50 μm) having a substantially homogenous distributions of the above-described coating constituents. A non-exhaustive list of suitable deposition techniques includes painting, rolling, taping, screen printing, doctor blading, spin-coating, spray-coating, suspension/slip casting, dip-coating, and dry film transfer processes. Additional deposition steps may also be performed (that is, STEP 66 may be performed iteratively) following intermittent heat treatment steps, as described more fully below in conjunction with FIG. 7.

After deposition of the coating precursor material layer(s) (STEP 68, FIG. 3), a heat treatment or firing process is next performed (STEP 70, FIG. 3). Heat treatment may be conducted in multiple stages or phases carried-out utilizing any number of furnaces, ovens, or other heat treatment systems. In various embodiments, an initial burnout phase is first conducted to thermally decompose any organic materials contained within the coating precursor materials. The organic burnout phase may be carried-out in accordance with a relatively gradual heating schedule; e.g., the coating precursor layers may be exposed to a temperature, which gradually increases to a peak process temperature of about 200 degrees Celsius (° C.) to about 600° C. and is then maintained at the peak process temperature for a predetermined time period of, for example, several minutes to several hours, depending upon layer thickness, the quantity and type of fugacious particles contained within the coating precursor material (if present), and other such factors. Organic burnout may be carried-out in an air environment in certain embodiments. Alternatively, organic burnout may be performed in a vacuum or in a non-oxidizing atmosphere (e.g., a carbon monoxide, carbon dioxide, or forming gas atmosphere) to deter surface oxide regrowth.

A higher temperature, rapid heating phase is further performed during STEP 70 of process 60 (FIG. 3) to sinter and densify the coating precursor material and thereby transform the coating precursor material into a sintered coating layer. The sintering phase of heat treatment also create the desired bond attaching and, perhaps, directly joining the innermost sintered coating layer (e.g., layer 50(*a*) in FIG. 2) to the ceramic component body (e.g., ceramic component body/substrate 46 in FIG. 2). Peak temperatures during the sintering phase of heat treatment may range between about 1400° C. and about 1800° C. The sintering/coating densification phase may produce optimal results when following a relatively aggressive heating schedule or temperature ramp-up; e.g., when heating the coating precursor material to the peak processing temperature, an average time-versus-temperature slope greater than about 300° C. per minute and, perhaps, greater than 375° C. per minute may be employed. In one implementation, the processing temperature may increased from approximately room temperature (~23° C.) to greater than 1500° C. in less than 4 minutes. Again, such a firing or sintering step may be carried-out in a non-oxidizing atmosphere or under vacuum to prevent or at least deter surface oxide regrowth.

Embodiments of the heat treatment process may also be described as entailing: (i) an organic burnout phase during which the first layer of coating precursor material is heated to a first peak temperature within a first time period, and (ii) a subsequently-performed sintering or firing phase during which the first layer of coating precursor material is heated to a second peak temperature within a second time period. The first peak temperature may be less than the second peak temperature, while the first time period is greater than the second time period. Additionally, during the sintering phase, heating the first layer of coating precursor material at a rate exceeding 300° C. per minute to attain the second peak temperature.

Figure 7:
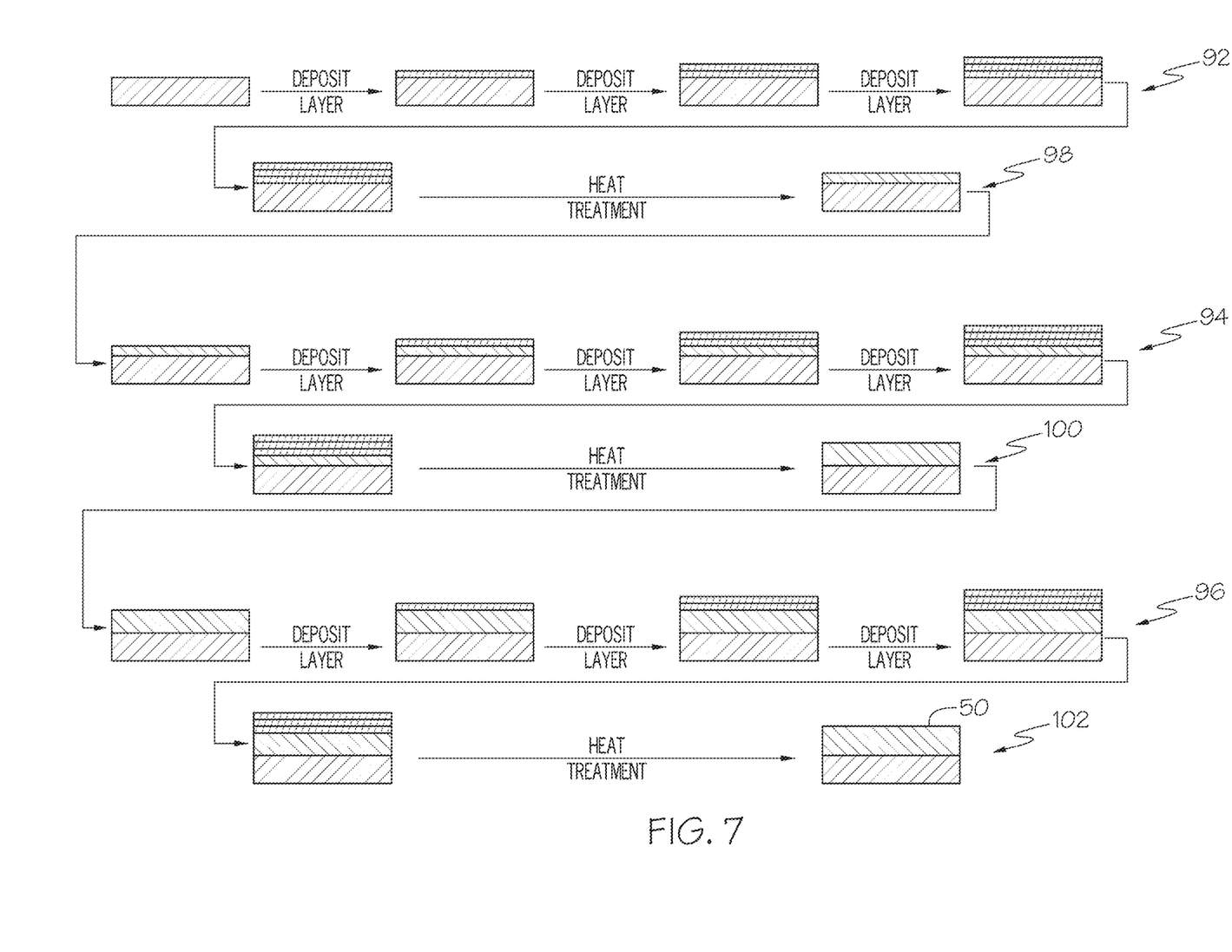

As indicated in FIG. 3 at STEP 70, the foregoing process steps (STEPS 66, 68) may be repeated to iteratively form additional sintered coating layers (e.g., coating layers 50(*b*)-(*d*) in FIG. 2). In this manner, the sintered coating body may be successively compiled or built-up over the ceramic component body/substrate to a desired thickness. The manner in which coating precursor material deposition (STEP 66) and heat treatment (STEP 68) may be repeatedly and alternatively performed to compile the sintered coating body is further generically illustrated in FIG. 7. Specifically, FIG. 7 illustrates a series of sequentially-performed deposition steps 92, 94, 96, which are interspersed with three heat treatment steps 98, 100, 102 to yield a sintered coating body 50 having a desired thickness; reference numeral "50" carried-over from FIG. 2 for consistency. In this example, a first series of deposition steps 92 is performed, followed by a first heat treatment step 98, followed by a second series of deposition steps 94, followed by a second heat treatment step 100, followed by a third series of deposition steps 96, and lastly followed by a third and final heat treatment step 102. The number of coating deposition steps and sintering steps will vary amongst embodiments based, at least in part, on the desired final thickness of sintered coating body 50 (and noting that some thickness may be removed from the sintered coating body via a subsequently-performed thinning step, such as grinding or polishing). In one embodiment, the final thickness of sintered coating body 50 may range from about 100 μm to about 400 μm in an embodiment. In other embodiments, sintered coating body 50 may be thicker or thinner than the aforementioned range.

As noted above, sintered coating body 50 may be produced to contain striations or bands of decreased porosity, which extend along sintered layer-to-sintered layer boundaries or interfaces within body 50. Such dense bands within body 50 may be created when layers of the coating precursor material are applied in a wet state during the coating formation process; the wet-state coating precursor material seeps or wicks into an underlying, previously-formed, porous sintered coating layer to at least partially fill the pores exposed thereof; and a band of decreased (possibly zero) porosity is created upon subsequent firing of the wet-state coating precursor material. This effect usefully increase the resistance of sintered coating body 50 to high temperature steam penetration in the GTE environment. If desired, the initially-deposited layer of wet-state coating precursor material may be applied in a state lacking organic fugacious particles (pore formers) or contain a decreased amount of organic particles to enhance this beneficial effect. More specifically, in an implementation of the process set-forth in FIG. 7 in which the layers of coating precursor material are screen printed or otherwise deposited in a wet state, the layer of coating precursor material initially laid down to begin each deposition step 92, 94, 96 may be deposited in a state containing a lesser amount of fugacious organic particles relative to the subsequently-applied layers of coating precursor material and potentially in a state lacking fugacious organic particles entirely.

Certain benefits may achieved by forming sintered coating body 50 to have a controlled, non-zero porosity, which varies through the coating thickness. In various embodiments, the desired controlled and perhaps thickness-varied porosity is created by selectively adding fugacious organic particles to the base coating precursor material. During the heat treatment process, the fugacious organic particles thermally decompose to create voids or gas-filled pockets within the sintered coating body having dimensions approximately equivalent to those of removed organic particles. The particular organic material or materials chosen for this purpose, the particle size or sizes, and the particle shape will vary amongst embodiments. In one embodiment, the fugacious organic particles are composed of a polymer, such as an acrylic. The fugacious organic particles may have a spherical, oblong, rod-like, or laminae shapes, or a combination thereof. In certain embodiments, the average minimal cross-sectional dimension of the particles (the average diameter in the case of spherical particles) may range from about 1 μm to about 10 μm and, perhaps, from about 3 μm to about 6 μm. The peak temperature utilized during heat treatment to remove the fugacious spheres may range from about 450° C. to about 550° C. in implementations. In other embodiments, the relevant parameters may be greater than or less than the aforementioned ranges.

The quantity of fugacious organic particles present in the coating precursor material can be varied between each series of deposition steps 92, 94, 96 to create a controlled and varied porosity through the thickness of sintered coating body 50 (FIG. 2). In certain embodiments, the initially-applied layer or layers of coating precursor material (e.g., those layers applied at step 92 in FIG. 7) may contain a first amount of organic particles, while one or more subsequently-applied layers of coating precursor material may have a second amount of organic particles exceeding the first amount (which may be a zero value). In this manner, the resultant sintered coating body and, more generally, the resultant high temperature coating may be imparted with a first (e.g., minimum) porosity adjacent the component body/substrate and a second (e.g., maximum) porosity further from the component body/substrate. The second (e.g., maximum) porosity may be at least twice the first porosity. For example, with reference to FIG. 2, fugacious organic particles may be added to the base coating precursor material after the first sintering step (and, therefore, after the initial coating precursor material deposition) to impart sintered coating body 50 with a thickness-varied porosity, which increases in a step-wise or non-linear fashion when transitioning from innermost sintered coating layer 50(a) to overlying sintered coating layer 50(b), 50(c), or 50(d). In alternative embodiments, the amount of organic particles present in the coating precursor material may be varied to impart with a porosity varying in another manner.

Process 60 concludes with STEP 72 (FIG. 3) during which final processing steps are performed to complete fabrication of the high temperature coating. Such additional steps can include precision machining, the performance of additional heat treatments steps, and/or the formation of additional coating layers over the sintered coating body produced during STEPS 66, 68, 70 (FIG. 3). An example of such an additional coating layer is topcoat 54 shown in FIG. 2. As previously discussed, such an additional coating layer may be formed for enhanced sealing purposes in certain instances to, for example, impart the resultant high temperature coating with additional resistance to steam penetration. Such a sealant topcoat can be applied as, for example, a sol-gel or by depositing and sintering a still further layer of the coating precursor material mixed with an increased glass content. If formed, the sealant topcoat layer is advantageously created after precision grinding of sintered coating body 50. In other embodiments, a different topcoat layer or coating system (e.g., a TBC) may be formed over the sintered coating body (e.g., sintered coating body 50 shown in FIG. 2 or sintered coating body 112 shown in FIG. 7) or the high temperature coating may lack any additional coating layers.

Figure 8:
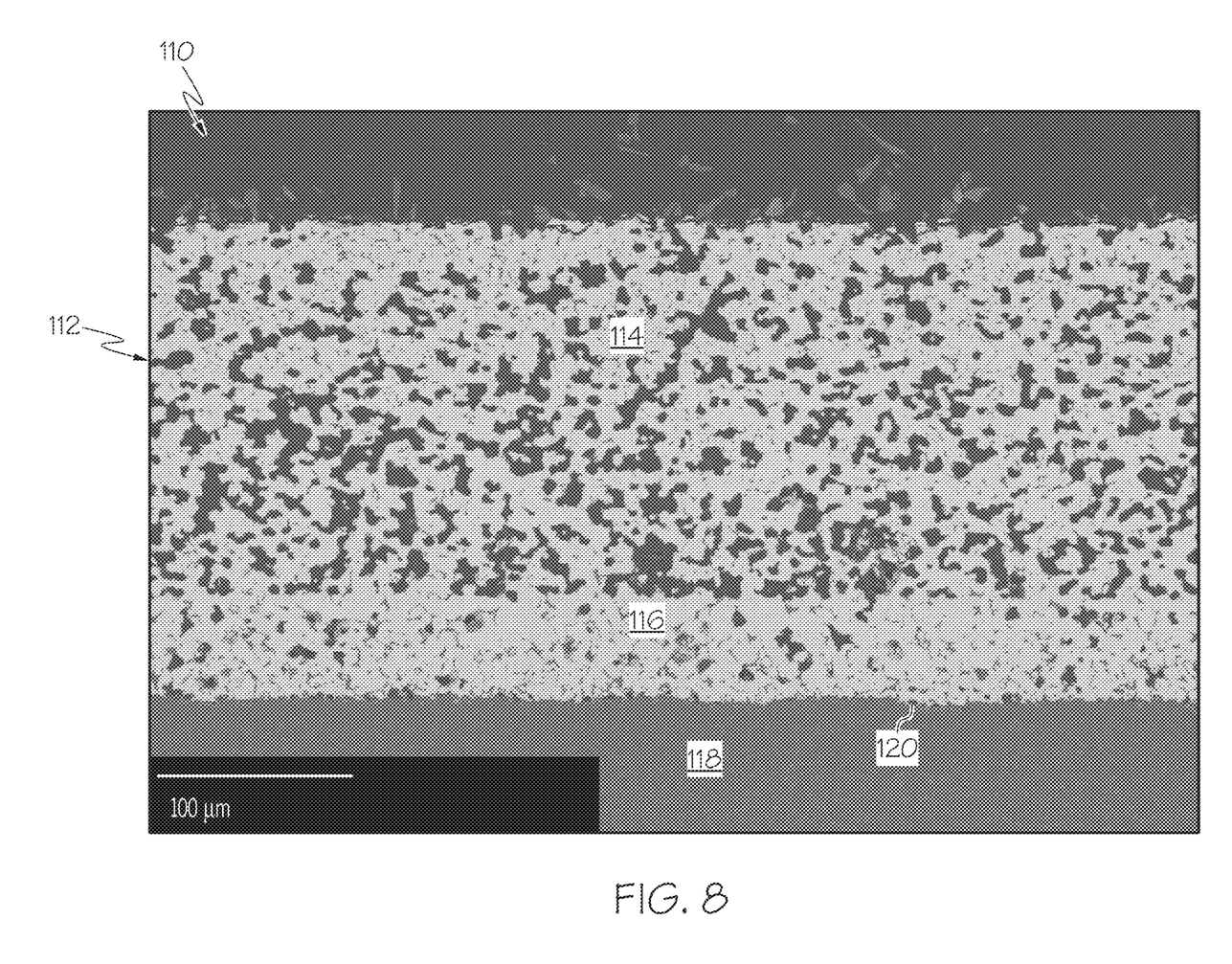
FIG. 8 is an SEM image of a sinter-bonded high temperature coating, as reduced to practice and further produced in accordance with the exemplary high temperature coating formation process set-forth in FIG. 3.

Turning lastly to FIG. 8, there is shown a SEM image of a high temperature coating 110 produced according with process 60 (FIG. 3) and reduced to practice. High temperature coating 110 is directly sintered bonded to an underlying ceramic component body/substrate 118. In the illustrated example, high temperature coating 110 consists entirety of a sintered coating body 112, which includes two sintered coating regions or layers 114, 116. Sintered coating region 116 is the base or innermost coating region and is thus located closer to ceramic component body/substrate 118 than is sintered coating region 114 (the outermost coating region). Sintered coating region 114 overlies and is directly bonded to sintered coating region 116. Comparatively, sintered coating region 116 is bonded directly to and intimately contacts a selected surface of ceramic component body/substrate 118. In an embodiment, ceramic component body/substrate 118 may be composed of a silicon-ceramic material from which surface oxides have been removed utilizing a chemical etchant imparting principal surface 120 with a rough or non-planar topology; e.g., surface 120 may be characterized by a topology having average feature height or depth exceeding 0.1 μm, as previously described.

As can be seen in the SEM image of FIG. 8, sintered coating region 114 has an increased porosity relative to region 116. By way of example, sintered coating region 114 may have a first (maximum) average porosity ranging from about 20 vol % to about 40 vol %, while sintered coating region 116 has a second (minimum) average porosity less than the first (maximum) average porosity and, perhaps, less than about 10 vol %. These disparate porosities may be created utilizing the fugacious organic particle approach described above in conjunction with FIG. 3. The decreased porosity of innermost sintered coating region 116 may improve bond integrity with ceramic component body/substrate 118 and enhance the ability of high temperature coating 110 to act as an EBC, while the increased porosity of overlying coating region 114 may improve the overall strain compliance and thermally insulative properties of high temperature coating 110. The relative thicknesses of sintered coating regions 114, 116 will vary amongst implementations. However, by way of example, innermost sintered coating region 116 may be thinner than outermost sintered coating region 114; e.g., in an embodiment, the more dense innermost sintered coating region 116 may constitute between about 10% to about 40% of total coating thickness, while the less dense outermost sintered coating region between about 60% to about 90% of total coating thickness. In other embodiments, high temperature coating 110 may contain additional layers and/or other variations in porosity, such as those described above in conjunction with FIG. 2.

CONCLUSION

There has thus been provided high temperature coatings well-suited for formation over ceramic turbomachine components including, but not limited to, silicon-ceramic GTE components. Embodiments of the high temperature coating are bonded directly to the component body eliminating reliance on bond coats. Through the elimination of bond coats, failure paths involving recession, delamination, and other bond coat compromise are precluded. Coating manufacturing processes may also be eased. A high integrity bond is formed between the high temperature coating and the underlying ceramic component body or substrate utilizing a sinter bonding process, by removing surface oxides, and by deterring surface oxide regrowth until at least the initial stages of sinter bonding. Iterative deposition and firing processes may be performed to compile the high temperature coating to a desired thickness over the ceramic coating body. The high temperature coating may also have a controlled, non-zero porosity, which, in certain embodiments, may vary in a step-wise fashion through the coating thickness. Such controlled porosities can improve the thermally insulative abilities and strain compliance of the high temperature coating, while preserving coating toughness and coating-to-substrate bond integrity. The resultant high temperature coating may be relatively resistant to penetration of combustive byproducts, such as steam, which can otherwise erode the underlying (e.g., silicon-containing) ceramic substrate body or substrate. Although not limited to any particular application, the high temperature coatings may be particularly well-suited for formation over selected surfaces of ceramic GTE components directly exposed to high temperature gas flow during GTE operation.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A method for forming a spallation-resistant high temperature coating over a turbomachine component having a ceramic component body, the method comprising:
   removing a surface oxide layer from the ceramic component body to expose a treated surface of the ceramic component body, the ceramic component body comprises a silicon-nitride material and the removing comprises contacting the surface oxide layer with molten sodium hydroxide (NaOH) over the silicon-nitride material and selectively removing silica scale and glass phases from the silicon-nitride material to produce a non-planar surface topography on the treated surface;
   depositing a first layer of a coating precursor material over the treated surface, the coating precursor material infiltrating into the non-planar surface topography, the first layer of the coating precursor material having a solids content composed predominately of at least one rare earth silicate by weight percentage;
   heat treating the first layer of the coating precursor material to sinter the solids content and form a first sintered coating layer bonded directly to the treated surface of the ceramic component body with a mechanical lock between the first sintered coating layer and the treated surface;
   depositing a second layer of the coating precursor material over the first sintered coating layer;
   heat treating the second layer of the coating precursor material to form a second sintered coating layer bonded to the first sintered coating layer; and
   forming a top coating layer over the second sintered coating layer having a porosity less than a porosity of the second sintered coating layer, the top coating layer forming an outermost layer of the high temperature coating and the high temperature coating is spallation-resistant.

2. The method of claim 1 further comprising:
   embedding organic particles in the second layer of coating precursor material; and
   during heat treatment of the second layer of the coating precursor material, thermally decomposing the organic particles to impart the second sintered coating layer with an increased porosity relative to the first sintered coating layer.

3. The method of claim 2 further comprising selecting an amount, size, and shape of the organic particles to impart the second sintered coating layer with a porosity between about 20 and about 40 percent by volume.

4. The method of claim 2 further comprising forming at least one additional coating layer over the second sintered coating layer prior to forming the top coating layer, the additional coating layer having a porosity greater than the porosity of the second sintered coating layer.

5. The method of claim 1 wherein heat treating comprises:
   performing an organic burnout phase during which the first layer of coating precursor material is heated to a first peak temperature within a first time period; and
   after the organic burnout phase, performing a sintering phase during which the first layer of coating precursor material is heated to a second peak temperature within a second time period;
   wherein the first peak temperature is less than the second peak temperature; and
   wherein the first time period is greater than the second time period.

6. The method of claim 5 further comprising, during the sintering phase, heating the first layer of coating precursor material at a rate exceeding 300 degrees Celsius per minute to attain the second peak temperature.

7. The method of claim 1 further comprising maintaining the ceramic component body in non-oxidizing atmospheres for a period of time encompassing the steps of removing the surface oxide and heat treating the first layer of the coating precursor material.

8. The method of claim 1 wherein removing comprises imparting the treated surface with a surface roughness exceeding 0.1 micron.

9. The method of claim 1 wherein the steps of removing, depositing, and heat treating are performed such that the first sintered coating layer is bonded directly to and intimately contacts the treated surface of the ceramic component body.

10. The method of claim 1 further comprising selecting the solids content of the coating precursor material to comprise:
80% to 100% at least one rare earth silicate by weight; and
0% to 20% at least one glass sintering aid by weight.

11. The method of claim 10 further comprising selecting the at least one rare earth silicate to comprise ytterbium disilicate.

12. The method of claim 10 further comprising selecting the at least one glass sintering aid to comprise 1% to 10%, by weight, of a sintering glass aid selected from the group consisting of magnesioaluminosilicate, magnesia, and alumina.

13. The method of claim 1 wherein contacting the surface oxide layer with the molten sodium hydroxide (NaOH) further comprises submerging the ceramic component body in a bath of the molten sodium hydroxide (NaOH).

14. A method for forming a spallation-resistant high temperature coating over a turbomachine component having a silicon-nitride component body, the method comprising:
removing a surface oxide layer from the silicon-nitride component body to expose a treated surface of the silicon-nitride component body, the removing comprises contacting the surface oxide layer with molten sodium hydroxide (NaOH) over the silicon-nitride component body and selectively removing silica scale and glass phases from the silicon-nitride component body to produce a non-planar surface topography on the treated surface;
building-up a sintered coating body over the treated surface of the silicon-nitride component body by iteratively performing the steps of: (i) depositing coating precursor material layers containing rare earth silicate particles over the treated surface, and (ii) heat treating the coating precursor material layers to sinter the rare earth silicate particles and form a portion of the sintered coating body, the building-up including depositing a first layer of the coating precursor material over the treated surface and heat treating the first layer of the coating precursor material to sinter the rare earth silicate particles and form an innermost layer of the sintered coating body, with a mechanical lock formed between the innermost layer of the sintered coating body and the treated surface;
imparting the sintered coating body with a desired porosity that varies from the innermost layer of the sintered coating body to an outermost layer of the sintered coating body by: (i) adding organic particles to at least the first layer of coating precursor material layer included in the coating precursor material layers and, (ii) thermally decomposing the organic particles when heat treating the first layer of coating precursor material layer, the innermost layer directly bonded to the treated surface of the silicon-nitride component body and the outermost layer has a porosity that is greater than a porosity of the innermost layer; and
forming a top coating layer over the outermost layer of the sintered coating body having a porosity less than the porosity of the outermost layer of the sintered coating body, the top coating layer forming an outermost layer of the high temperature coating and the high temperature coating is spallation-resistant.

* * * * *